Patented Aug. 2, 1938

2,125,484

UNITED STATES PATENT OFFICE 2,125,484

NONLIFTING LACQUER

Charles Bogin, Terre Haute, Ind., assignor to Commercial Solvents Corporation, Terre Haute, Ind., a corporation of Maryland No Drawing. Application December 14, 1935, Serial No. 54,376

3 Claims. (Cl. 91—68)

My invention relates to improvements in nitrocellulose lacquers. More specifically my invention relates to improved means for inhibiting lifting in the application of a plurality of coats of nitrocellulose lacquers of the types which contain drying oil modified synthetic resins.

Certain types of modified synthetic resins, especially those which contain drying oils, semi-drying oils, drying oil fatty acids, etc., have been found to be very desirable constituents of nitrocellulose lacquers. Lacquers containing certain resins of this type are particularly advantageous from the standpoint of their high solid content, thus reducing the number of coats necessary to secure a satisfactory finish. These lacquers have numerous other advantages such as excellent durability, high water resistance, and freedom from heat printing. Such lacquers, however, have been found to have a serious disadvantage in their tendency to "lift" when applied in a plurality of coats. This lifting is evidenced by a wrinkling of the surface which may vary in degree from very fine wrinkles almost indistinguishable from "orange peel" to heavy wrinkles of extremely undesirable appearance. This phenomenon is encountered in varying degrees depending upon the particular resin, the particular pigments utilized in the lacquer and the undercoat or surface on which the lacquer is applied. Although lifting is not always encountered to an objectionable degree, it may be encountered under some conditions with any lacquer containing resins of this type, with the consequence that these resins have not come into commercial use in lacquers.

I have now discovered that the lifting encountered with lacquers of this type may be inhibited to a great extent, and often eliminated entirely, by incorporating in the lacquer an anti-oxidant for the resin employed. The anti-oxidant may be used in extremely small amounts and will serve to inhibit lifting for periods longer than normal application schedules for lacquer finishing. For example, a concentration of 0.2% of a suitable anti-oxidant based upon the weight of the resin used will inhibit lifting for a period of 3 to 4 weeks or even longer. Such periods are sufficient for all finishing operations and even for the retouching after shipment which is often necessary, particularly in the case of the automobile industry. It is thus seen that my invention enables the drying oil modified synthetic resins to be utilized to their full advantage in the lacquer industry.

The resins to which my invention is applicable may be any of the soluble synthetic resins which contain drying oils, semi-drying oils, drying oil fatty acids or the like. For convenience, all such types of resins will be referred to herein as drying oil modified synthetic resins. Among these resins the drying oil modified "glyptal" resins are particularly suited for use in lacquers, and my invention is especially adapted for use in conjunction with such resins. Various of these resins are available commercially under trade names such as "Beckosol No. 1320", "Rezyl No. 1102", "G. E. No. 1247", etc. A resin of this type which is particularly desirable in its film forming properties, comprises a condensation product of a reaction product of 2 parts of 30% formaldehyde and 2 parts of butyl phenol with a reaction product of 4 parts of phthalic anhydride, 6 parts of linoleic acid, 2 parts of rosin and 3 parts of glycerine. Numerous similar resins are well known in the art and it is to be understood that my invention applies to the use of all resins of this general type.

A large number of suitable anti-oxidants for resins of this type are readily available. Among the materials which I have found to have an anti-oxidant effect upon these resins may be mentioned:

αnaphthol.
Hydroquinone.
p-Hydroxy diphenylamine.
Catechol.
Nitroso phenyl hydroxylamine.
p-Hydroxy phenyl morpholine.
1-5 dihydroxy naphthalene.
Pyrogallol.
o-Amino phenol.
Dibenzyl p-amino phenol.
1-2 naphthoquinone.
Diphenyl amine.
p-Amino phenol.
3-5 dinitro benzoic acid.
Methyl para-amino phenol sulphate.
Mono-benzyl p-amino phenol.
Glycin.
Resorcinol.
p-Phenylene diamine.
p-Dimethylamino benzaldehyde.

As would naturally be expected, the various anti-oxidants for resins of this type do not have equal anti-oxidant powers, and I have found that the materials in the first half of the list given above are superior in general to those given in the last half of the list. However, all of these materials, as well as many others which will readily suggest themselves to those skilled in the art, have definite anti-oxidant effects, and it may be desirable, from an economic standpoint, to use a larger amount of a cheaper and less effective material rather than a smaller amount of a much more expensive material. Among the materials mentioned above I prefer to use hydroquinone, αnaphthol, or pyrogallol since these materials are particularly desirable both from a technical and economical standpoint. It is to be distinctly understood, however, that my invention is not to be construed as limited to any particular anti-oxidants mentioned by way of example, but includes within its scope any anti-oxidant for the type of resin specified.

The amount of anti-oxidant to be employed will depend upon the particular resin utilized, the pigments employed in the lacquer, the nature of the base or undercoat to which the lacquer is applied, the effectiveness of the anti-oxidant, and the degree of protection desired. It will be evident that resins containing large amounts of drying oils or other highly unsaturated constituents will require a larger amount of anti-oxidant than those containing substantially smaller amounts of oxidizable components. Likewise, lacquers which contain oxidizing pigments, or pigments having oxidizing impurities, will require larger amounts of anti-oxidants than those containing only inert ingredients. It is well known in the art that the lifting effect is more pronounced when the lacquer is applied on surfaces such as glass, then when applied on a suitable undercoat which gives improved adherence, and for this reason it may be desired to vary the proportion of anti-oxidant depending on the nature of the base or undercoat. It will also be apparent that if the finishing schedule is short and no retouching is contemplated, a lesser degree of protection may be satisfactory and the percentage of anti-oxidant may thus be reduced. It will be evident that in any particular case simple preliminary tests with varying amounts of anti-oxidants will readily determine the optimum concentration to be employed. In general, however, it may be said that from 0.2% to 1.0% of anti-oxidant based on the weight of the resin will usually be satisfactory.

The application of my invention to lacquers having various drying oil modified synthetic resins and various pigments is illustrated in the following specific examples. In these examples the solid constituents of the lacquer are given, and the quantities specified in each case may be incorporated in 100 c. c. of a suitable solvent mixture to give a lacquer of spraying consistency. It will, of course, be apparent that any of the usual solvent mixtures may be employed and that my invention is applicable to brushing lacquers as well as spray lacquers:

Example I

| | Grams |
|---|---|
| Nitrocellulose (½ sec.) | 6 |
| Drying oil modified glyptal resin ("Rezyl No. 1102") | 12 |
| Dibutyl phthalate | 1 |
| α naphthol | 0.025 |

Example II

| | Grams |
|---|---|
| Nitrocellulose (½ sec.) | 6 |
| Drying oil modified glyptal resin ("Beckosol No. 1320") | 18 |
| Dibutyl phthalate | 1.5 |
| Crome yellow | 8 |
| Hydroquinone | 0.05 |

Example III

| | Grams |
|---|---|
| Nitrocellulose (½ sec.) | 6 |
| Drying oil modified synthetic resin ("Beckosol No. 1320") | 18 |
| Tricresyl phosphate | 2.1 |
| Titanium dioxide | 7.5 |
| Antimony oxide | 7.5 |
| Hydroquinone | 0.16 |

Example IV

| | Grams |
|---|---|
| Nitrocellulose (½ sec.) | 6 |
| Drying oil modified synthetic resin ("Beckosol No. 1320") | 18 |
| Tricresyl phosphate | 2.1 |
| Titanium dioxide | 6 |
| Antimony oxide | 6 |
| Lithopone | 3 |
| Hydroquinone | 0.07 |

Example V

| | Grams |
|---|---|
| Nitrocellulose (½ sec.) | 6 |
| Drying oil modified synthetic resin ("G. E. No. 1247") | 12 |
| D butyl phthalate | 2 |
| Ferrite yellow | 10 |
| Pyragallol | 0.02 |

Example VI

| | Grams |
|---|---|
| Nitrocellulose (½ sec.) | 5.5 |
| Drying oil modified synthetic resin ("Rezyl No. 1102") | 16.5 |
| Dibutyl phthalate | 1 |
| Prussian blue | 7 |
| Hydroquinone | 0.16 |

It will be noted in the above examples that the amount of anti-oxidant employed is varied in accordance with the pigment content of the lacquer, and that lacquers containing relatively inert pigments require relatively small concentrations of anti-oxidant. However, in Examples III and VI substantially increased concentrations of anti-oxidants are employed to offset the shortened storage periods otherwise encountered with these lacquers. The shortening of the storage period during which anti-oxidant properties are maintained is believed to be due to the presence of oxidizing constituents in the pigments employed in these lacquers. Example IV illustrates how this effect may be offset to a certain extent by incorporating zinc sulphide pigments along with the pigments which apparently contain oxidizing constituents. The substitution of lithopone, in this example, for a portion of the titanium dioxide and antimony oxide of Example III reduces to a considerable extent the amount of anti-oxidant required. In Example VI the storage period will be found to be markedly shortened in spite of the increased concentration of anti-oxidant, so that in the case of lacquers containing pigments of this type it is usually preferable to incorporate the anti-oxidant just prior to application. In such case the amount of anti-oxidant specified in this example might be considerably reduced. From a consideration of these examples one skilled in the art can readily determine the proportion of anti-oxidant to be employed in any type of lacquer, and in any particular case simple preliminary experiments will readily determine the optimum concentration to be used.

The theory according to which my invention operates is not definitely understood, but it is probable that the beneficial effect is secured by preventing even partial oxidation of the lacquer film before application of the succeeding coat. The lifting effect encountered in lacquers of this type is possibly due to the formation of an unevenly oxidized film which is thus unevenly attacked by the solvents of the succeeding coat with resulting swelling in limited areas giving rise to a wrinkled appearance. The prevention of oxidation during this period by the use of anti-oxidants would thus prevent effects of this nature, and there is some evidence that my invention operates in this manner. For example, during the period in which lifting is inhibited the lacquer film remains soluble in the solvents of the succeeding coat, whereas in the cases in which lifting is encountered the film is incompletely soluble. A thoroughly aged coating, on the other hand, is substantially insoluble in lacquer solvents, and this holds true even where lifting has been inhibited for limited period by the use of anti-oxidants. The full advantages of the drying oil modified synthetic resins may thus be utilized in the application of my invention. The lifting tendency is inhibited during the required period but the film subsequently becomes insoluble, and thus attains all of the characteristics which make the drying oil modified synthetic resins desirable for use in lacquers.

Although my invention has been illustrated by means of a number of specific examples, it is to be distinctly understood that these are illustrative only, and that my invention is not to be construed as limited to the particular materials or proportions specified. Any of the soluble drying oil modified synthetic resins may be employed and any of the common lacquer constituents, e. g., solvents, diluents, plasticizers, etc., may be used, although it is desirable to eliminate oxidizing constituents from the lacquers insofar as possible. Any suitable anti-oxidants for resins of this type or any combination of anti-oxidants which would naturally occur to one skilled in the art, may be said to be included in the scope of my invention. Obvious modifications of the procedure such as incorporation of the anti-oxidant into the resin rather than into the lacquer, or incorporation of the anti-oxidant immediately prior to application rather than at the time of preparing the lacquer, are likewise included in the scope of my invention, as well as the use of any chemical equivalents for the materials specifically mentioned.

My invention now having been described what I claim is:

1. A process for inhibiting lifting, of a nitrocellulose lacquer containing a volatile solvent and a drying oil modified synthetic resin, for a period of time sufficient for the application of a plurality of coats, comprising incorporating in said lacquer an anti-oxidant for the resin of a character and in an amount sufficient to prevent oxidation of the lacquer film for the period of time between application of successive coats and longer than normal application schedules for lacquer finishing and sufficient to allow drying of an applied undercoat by evaporation of the solvent and the application of a subsequent coat, applying the undercoat and then applying the succeeding coat during the period of time in which oxidation of the undercoat is inhibited and while the undercoat is soluble in the solvents of the succeeding coat.

2. The process of claim 1 in which the anti-oxidant is from 0.2 to 1.0% of the weight of said resin.

3. The process of claim 1 in which the anti-oxidant is selected from the group: Hydroquinone, alpha-naphthol, pyrogallol and in which the resins are "glyptal" resins.

CHARLES BOGIN.